United States Patent [19]

Sauber

[11] 4,339,212

[45] Jul. 13, 1982

[54] POSITIONING COLLAR

[76] Inventor: Charles J. Sauber, 10 N. Sauber Rd., Virgil, Ill. 60182

[21] Appl. No.: 181,134

[22] Filed: Aug. 25, 1980

[51] Int. Cl.³ .............................. F16B 2/14; F16B 3/00
[52] U.S. Cl. .................................. 403/27; 403/324; 403/379
[58] Field of Search ............... 403/324, 378, 379, 325, 403/27, 359

[56] References Cited

U.S. PATENT DOCUMENTS 2,448,278   8/1948   Ronning ........................... 403/359

Primary Examiner—Andrew V. Kundrat
Attorney, Agent, or Firm—Leydig, Voit, Osann, Mayer & Holt, Ltd.

[57] ABSTRACT

An improved wedge lock collar clamping device which is suitably adapted to prevent a high tension wire stringing cable reel from moving axially along the driving axle of the type including a generally annular body adapted to receive a shaft through the longitudinal opening of the annular member, a transverse opening through the annular member which intersects with the longitudinal opening, the transverse opening being disposed to receive a lock pin, and a lock pin having a tapered surface which affects an interference fit with the shaft disposed in the longitudinal opening of the annular member when the pin is moved in a first direction and when the pin is moved in an opposite second direction the interference fit is eliminated with the clamping device free to move axially along the shaft, wherein the lock pin is provided with resilient end members that are color coded to insure proper directional driving and for safety in operation.

4 Claims, 5 Drawing Figures

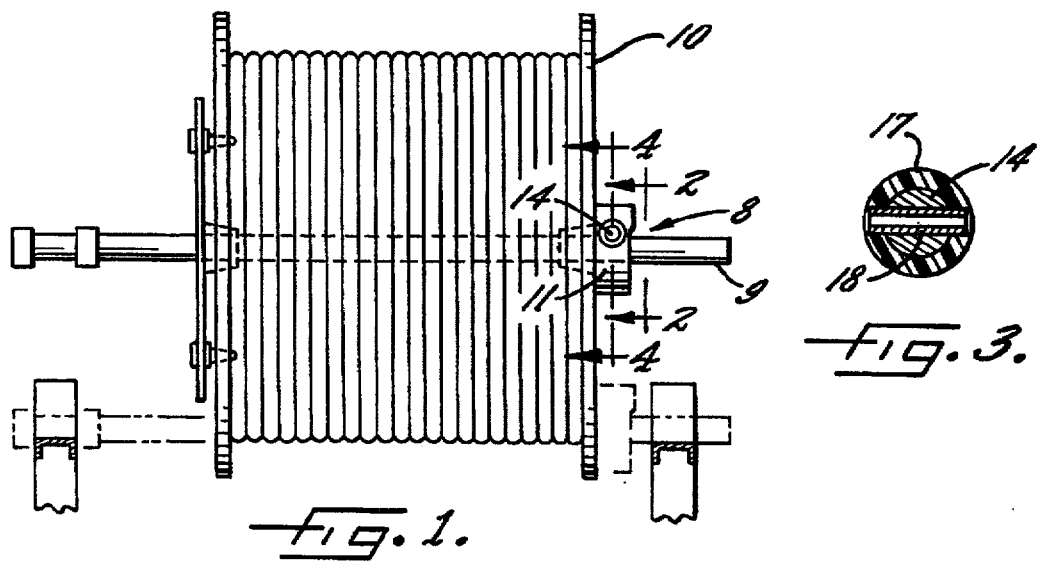
_fig.1._
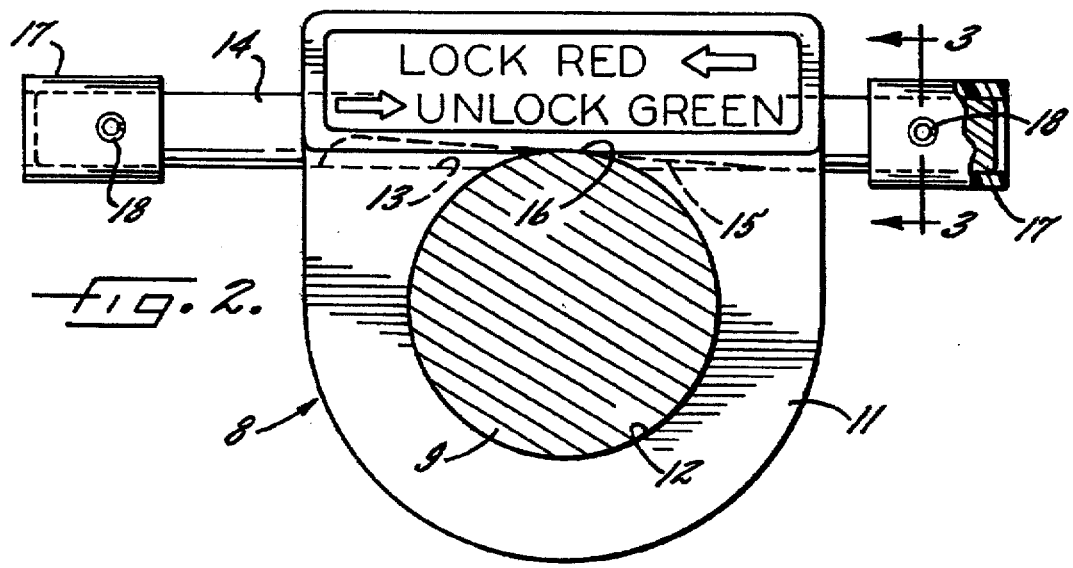
_fig.2._
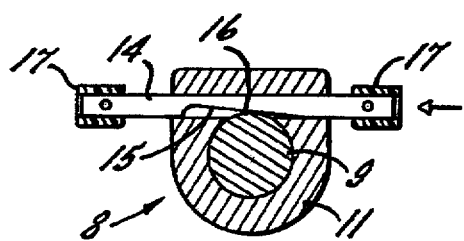
_fig.4._
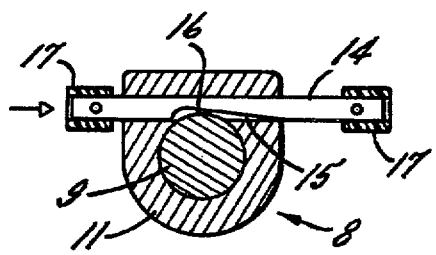
_fig.5._

POSITIONING COLLAR

FIELD OF THE INVENTION

The present invention relates generally to clamping collars for cylindrical shafts and more particularly to an improved wedge lock clamping collar which is safe, convenient and simple to securely lock the collar in any position on a cylindrical shaft without undesirably scoring the shaft or requiring special tools, loose parts or surfaces.

Specifically, the present invention is an improvement over my prior Wedge Lock Clamping Device disclosed in Sauber U.S. Application Ser. No. 939,243, filed Sept. 5, 1978, now abandoned.

BACKGROUND OF THE INVENTION

The present positioning collar invention is particularly suitable for use in, for example, a high tension cable stringing apparatus such as that described in Sauber Application Ser. No. 721,035, Improvement in Reel Brake Connection Apparatus, now abandoned. In my abovesaid Application Ser. No. 721,035 there is described high tension cable stringing apparatus comprising, in general, a pair of spaced upright columns terminating in generally U-shaped ends which support a shaft adapted to receive the cable reel for rotation therewith and to bridge the column U-shaped ends. A brake device supported adjacent to one of the columns has a coupling member facing the U-shaped end of the column. The reel support shaft has a mutually engageable coupling member at its end directed to the brake device. The coupling members provide quick connection by way of a rib and slot arrangement adapted to slidably mate when the support shaft is vertically placed over the U-shaped column ends.

In operation clamping devices may be placed in abutting relationship to the cable reel for the purpose of preventing the cable reel from sliding axially in an undesirable manner.

In high tension wire stringing, wire discharged from a cable reel, at a desired and controlled rate, is strung across utility poles. During stringing if any axial movement of the cable reel occurs it can cause flapping of the high tension wire as it is being discharged from the cable reel. Flapping of the wire being put up can result in contact with existing wire and even breakage thereof, possibly causing great harm to persons and property.

It has thus been an objective of the art to devise clamping devices that will eliminate wire flapping while, in addition, enabling easy loading and unloading of the cable reel or spool when the wire thereon has been expired. The commonly known clamping devices heretofore utilized have been collar-like structures provided with set screw arrangements that permit adjustable fixing with respect to the axle. There are numerous disadvantages and shortcomings which have been encountered with the set-screw device. For example, the set screws may get separated from the clamping body or, because they have to be tightened and loosened with a wrench, corroded or damaged threads may impair the ability to secure or release the set screw. Moreover, because a wrench is needed to tighten and loosen the set screws, changing the cable reels during operation is slow and tedious and generally undesirable. Similar problems have been encountered with split collar clamping devices utilizing nut and bolt to clamp it to the shaft.

A solution to these problems was presented by the clamping device of my above mentioned prior application Ser. No. 939,243 in that it was easily mounted on, removed from and positioned on an axle supporting a cable reel as well as being fairly inexpensive to manufacture and devoid of separable parts. This was achieved by an annular collar having a central longitudinal opening adapted to receive an axle or shaft and an intersecting transverse opening which received a shiftable, captively mounted lock pin. The lock pin had a tapered surface portion which when moved in one direction affected an interference fit with the shaft and when moved in the opposite direction formed a clearance allowing the collar to be moved easily along the shaft. Other similar devices were found to have been disclosed in German Pat. No. 671,920; U.S. Pat. Nos. 1,408,993; 2,627,431; 302,519; 291,728; 1,458,802, 2,785,814; and Swedish Pat. No. 124,927, all cited in the file of my abandoned application Ser. No. 939,243.

OBJECTS OF THE INVENTION

Although it would seem that problems should not arise in connection with proper use and safety aspects of the wedge locking type collars that has not been the actual situation. Personnel in the field applying hammers and the like to pound the lock pin in one direction or the other would lose sight of the proper side to strike for unlocking, and excessive striking in the wrong direction led to flaring or chipping of the lock pin and even with sending off flying pieces. The excessive wedging beyond that necessary brought about similar actions to then drive the pin in the opposite direction for unlocking.

Accordingly, it is an object of the present invention to provide an improved clamping collar which overcomes the foregoing problems and is more adequately recognized as to proper use and safer under even the most extreme circumstances of use.

Another object of the present invention is to provide a clamping collar wherein the locking pin has provision for eliminating the flairing and chipping of ends by severe hammer blows and particularly the hurling off of chips.

BRIEF DESCRIPTION OF THE DRAWINGS

Other objects and advantages of the present invention will be apparent from the following description and upon reference to the accompanying drawings, in which:

FIG. 1 is a fragmentary side plan view of the axle-cable reel assembly to which the positioning collar of the present invention is affixed.

FIG. 2 is an enlarged vertical plan view taken of the axle-cable reel-clamping collar substantially along the line 2—2 in FIG. 1;

FIG. 3 is a sectional view taken along the line 3—3 in FIG. 2;

FIG. 4 is a reduced sectional plan view illustrating the clamping lock pin of the present invention in the locked position; and, FIG. 5 is a reduced sectional view illustrating the clamping lock pin in the unlocked position.

While the invention will be described in connection with a particular preferred embodiment, it will be understood that it is not intended to limit the invention to that particular embodiment. On the contrary, it is intended to cover all alternatives, modifications and equivalents as may be included within the spirit and scope of the invention as defined by the appended claims.

DETAILED DESCRIPTION

Turning now to the drawings, FIG. 1 illustrates a collar clamping device generally indicated at 8 and constructed in accordance with the invention to clamp an axle 9 of a cable reel device 10 of the type described in Application Ser. No. 721,035, filed Sept. 7, 1976, now abandoned. The collar clamping device 8 is positioned on said axle in such a manner as to prevent axial movement of the cable reel 10 to the right as viewed in FIG. 1.

Referring to FIG. 2, the collar clamping device 8, in accordance with the invention, comprises a generally D-shaped body member 11 having a projecting tapered portion and a central longitudinal opening 12 adapted to receive the axle 9. The D-shaped member 11 includes a transverse opening 13 which intersects with and partially overlaps longitudinal opening 12. A lock pin, 14, is disposed within the transverse opening 13 and captivated therein as herein explained.

In order to effect the desired wedging between the collar and axle 9, the lock pin 14 has a substantially flat tapered surface 15 facing the inner edge 16 of the member 11 and the axle 9. The tapered surface is dimensioned so that as the lock pin is moved in a first direction, the lock pin will affect an interference fit with the axle thereby locking the clamping device to the axle in the selected location on the axle, and as the lock pin is moved in a second direction the lock pin and axle will form a clearance therebetween so that the clamping device may be moved easily along the axle. Thus as may readily be seen in FIGS. 2, 4 and 5, as the lock pin is moved from right to left as viewed in FIG. 4, the tapered surface affects an interference fit with the axle thereby holding the clamping device to the axle at the selected position. Conversely, as the lock pin is moved from left to right, as viewed in FIG. 5, a clearance is formed between the lock pin and the axle so that the clamping device may be moved easily along the axle.

As can be readily appreciated by those skilled in the art the clamping device described herein may be positioned anywhere on the axle and thus will be suitable for use with any cable reel in order to limit the axle movement of the cable reel thereby preventing flapping of the high tension wire during discharge.

In accordance with the present invention, resilient means are fixedly mounted on both of the ends of the lock pin 14 so as to surround the pin ends and protect against excessive pounding or the like with a hammer that will cause mushrooming and even chipping off of pieces. The resilient means 17 are preferably in the form of short lengths of annular rubber hose or the like which includes some internal reinforcement. In order to fixedly mount the resilient means, expandable type fastener pins 18 are positioned transversely through the lock pin and the resilient means.

In its preferred arrangement, the resilient means protrudes slightly beyond the ends of the lock pin 14 to further curtail undesirable mushrooming and breaking off of chips by repeated striking of the pin with a hammer or the like.

In accordance with another aspect of the present invention, the resilient means are each specifically color coded such as with green indicating the pin end to be struck for unlocking the collar and red indicating the end to be struck for locking the collar on an axle. Thus, the added visibly recognizable identification of the proper pin end to strike eliminates undesirable situations where either mistake or confusion leads to breakage of components or even possible injury.

I claim as my invention:

1. A positioning collar clamping device comprising, a generally D-shaped body member and projecting tapered portion adapted to receive a shaft through the central longitudinal opening of said member, means defining a transverse opening through said member and overlapingly intersecting with the shaft receiving longitudinal opening of said member, said transverse opening being disposed so as to receive a shiftable lock pin adapted to affect an interference fit with said shaft disposed within said longitudinal opening, said lock pin having a tapered surface thereon so that when said pin is moved in a first direction the interference fit between the pin and shaft occurs while shifting said pin in a second direction reduces and eliminates the interference fit between said pin and said shaft, resilient means fixedly mounted on each of the ends of said lock pin and said resilient means comprises annular rubber hose members secured to said lock pin ends by transverse fastener pin means.

2. A positioning collar clamping device as claimed in claim 1 wherein said resilient means members project outwardly beyond the ends of the pin.

3. A positioning collar clamping device as claimed in claim 1 wherein said resilient means are respectively color coded for visual recognition of said first and second directions.

4. A positioning collar clamping device as claimed in claim 3 wherein said color coding for the first direction is red and the color coding for the second direction is green.

* * * * *